(12) United States Patent
Desai et al.

(10) Patent No.: US 10,129,396 B1
(45) Date of Patent: Nov. 13, 2018

(54) SYSTEM AND METHOD FOR PROVIDING SELF-SERVICE WHILE ON HOLD DURING A CUSTOMER INTERACTION

(71) Applicant: JPMorgan Chase Bank, N.A., New York, NY (US)

(72) Inventors: Prashant Desai, Land O Lakes, FL (US); Parind S. Poi, Lewisville, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 16 days.

(21) Appl. No.: 15/358,312

(22) Filed: Nov. 22, 2016

(51) Int. Cl.
*H04M 3/00* (2006.01)
*H04M 3/428* (2006.01)
*H04M 3/51* (2006.01)
*H04M 3/523* (2006.01)

(52) U.S. Cl.
CPC ....... *H04M 3/4285* (2013.01); *H04M 3/5166* (2013.01); *H04M 3/5191* (2013.01); *H04M 3/5238* (2013.01)

(58) Field of Classification Search
CPC ............. H04M 3/5191; H04M 3/5183; H04M 3/5175; H04M 3/5166; H04M 3/5232; H04M 3/5133; H04M 3/523; H04M 3/5233; H04M 3/5238; H04M 3/51

USPC .......................... 379/265.01-265.02, 265.09
See application file for complete search history.

(56) References Cited

U.S. PATENT DOCUMENTS

| | | | | |
|---|---|---|---|---|
| 7,418,095 | B2 * | 8/2008 | Knott | H04M 3/42348 |
| | | | | 379/265.01 |
| 9,699,646 | B2 * | 7/2017 | Poon | H04W 8/22 |
| 2006/0080130 | A1 * | 4/2006 | Choksi | 705/1 |
| 2007/0230681 | A1 * | 10/2007 | Boyer | 379/265.01 |
| 2012/0321071 | A1 * | 12/2012 | Fisher, Jr. | 379/265.09 |
| 2013/0251126 | A1 * | 9/2013 | Hollander et al. | 379/93.17 |

\* cited by examiner

*Primary Examiner* — Rasha Al Aubaidi

(74) *Attorney, Agent, or Firm* — Hunton Andrews Kurth LLP

(57) ABSTRACT

The invention relates to a customer interaction management system that comprises a memory, an input and a computer processor programmed to: interact, via a first communication channel, with the customer via an automate self-service feature; receive a customer input to opt out of the automated self-service feature; place the customer in a queue with an estimated wait time; determine whether the estimated wait time exceeds a threshold wait time; engage the customer in a self-service on hold feature via a second communication channel separate from the first communication channel; and maintain the customer's place in the queue while the customer interacts with the self-service on hold.

16 Claims, 4 Drawing Sheets

SYSTEM AND METHOD FOR PROVIDING SELF-SERVICE WHILE ON HOLD DURING A CUSTOMER INTERACTION

FIELD OF THE INVENTION

The invention relates generally to a system and method for providing a self-service feature, and more particularly to a system and method that provides self-service functionality via a separate channel while a customer is on hold during a customer interaction.

BACKGROUND OF THE INVENTION

Many companies offer a customer service contact center where customers can call to resolve issues and seek answers. Most contact centers provide an automated self-service feature where the customer can walk through a menu of options. In traditional systems, after the customer requests an agent and is placed on hold, it is generally too late to re-engage in a self-service process, such as an Interactive Voice Response (IVR) system. As a result, customers are forced to wait the entire duration. Oftentimes, customers are frustrated by the long wait time and will terminate the call and try again later or seek alternative methods to resolve issues and concerns.

These and other drawbacks currently exist.

SUMMARY OF THE INVENTION

According to one embodiment, the invention relates to a customer interaction management system that comprises: a memory that stores and manages customer profile data and customer interaction data; an input that receives a voice input from a customer; and a computer processor, coupled to the memory and the voice response input. The computer processor is programmed to: interact, via a first communication channel, with the customer via an automate self-service feature; receive a customer input to opt out of the automated self-service feature; place the customer in a queue with an estimated wait time; determine whether the estimated wait time exceeds a threshold wait time; engage the customer in a self-service on hold feature via a second communication channel separate from the first communication channel; and maintain the customer's place in the queue while the customer interacts with the self-service on hold.

The method may be conducted on a specially programmed computer system comprising one or more computer processors, mobile devices, electronic storage devices, and networks.

The invention also relates to method for implementing a customer interaction management method, the method comprising the steps of: interacting, via a first communication channel, with the customer via an automate self-service feature; receiving a customer input to opt out of the automated self-service feature; placing the customer in a queue with an estimated wait time; determining whether the estimated wait time exceeds a threshold wait time; engaging the customer in a self-service on hold feature via a second communication channel separate from the first communication channel; and maintaining the customer's place in the queue while the customer interacts with the self-service on hold.

The computer implemented system, method and medium described herein provide the advantages of an improved customer experience. The innovative system and method seek to provide customers an option to engage in a self-service feature while the customer remains in a queue to speak or interact with an agent. For example, a first channel may include a chat, digital video or other interactive channel. An embodiment of the present invention is directed to promoting efficiency, reducing wait time and minimizing customer frustration. Other advantages that can be provided are customer loyalty and retention due to the increased customer satisfaction and less overall live contacts in the contact center driving operational efficiencies. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
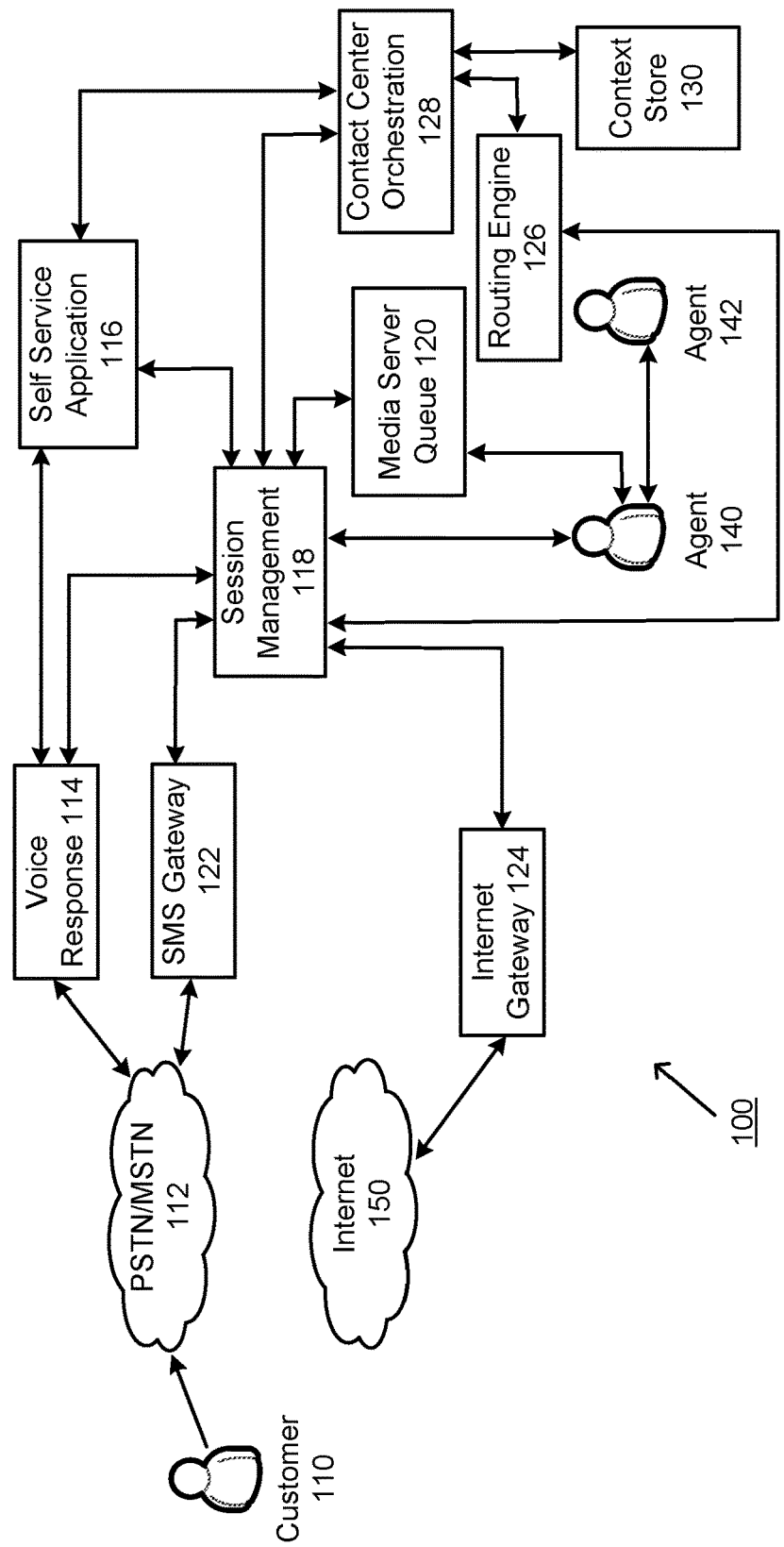
FIG. 1 illustrates a schematic diagram of a customer interaction management system, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to providing a self-service option to customers while on hold during a customer interaction. For example, a customer may interact with an entity, via a voice communication. During the voice communication, the customer may be presented with an Intelligent Voice Response (IVR) option. Some customers may seek to bypass the IVR and request immediate interaction with a customer representative instead. After making this decision, the customer may be placed in a queue and be informed of a wait time. An embodiment of the present invention is directed to engaging the customer in a self-service and/or automated option during the wait time to address and/or resolve the customer's reason for the contact, if the wait time is over a predetermined threshold, e.g., 5 minutes or more. During the hold time, the system seeks to resolve and/or make progress on the reason for the customer contact.

An embodiment of the present invention is directed to improved utilization of customer wait time and further directed to expediting service and resolution for customers. The innovative system provides an opportunity for customers to engage in a self-service feature while on hold. This feature is provided after a customer opts out of an IVR process only to be confronted with a long wait time. Generally, after the customer requests to speak to an agent, the customer is placed in a queue. At this point, it is generally too late to re-engage in a self-service process. As a result, customers are forced to wait the entire duration. The various embodiments of the present invention provide increased automation rates as well as call reduction benefits. The system seeks to improve service levels and better address customer issues in a timely manner. Moreover, average wait times may be reduced through the innovative self-service feature. The system also achieves improved overall customer experience. Because the system seeks to address the customer's reason for the call in a timely manner, more customers may be encouraged to use lower cost digital channels. In addition, customers will likely participate in these easy-to-use channels in the future for such requests, thereby achieving call reduction.

While the exemplary illustrations are directed to a customer interactions with a financial institution, the embodiments of the present invention may be applied to various service-based and other industries.

FIG. 1 illustrates a schematic diagram of a customer interaction management system 100, according to an exemplary embodiment. As shown in FIG. 1, Customer 110 may have a voice interaction with a Contact Center representing an entity. The Contact Center may represent a centralized office that receives customer contacts, usually phone calls, through an automated service with trained agents and other representatives. For example, a customer may communicate with a contact center associated with a financial institution to resolve an issue concerning an account, card product, investment portfolio and/or other products and services. The customer may also engage the contact center with questions concerning fraud, loss and/or other activity.

Customer contact may be established using a phone (e.g., mobile device, etc.) via a communication connection, such as phone TDM (Time-division multiplexing), phone VoIP (Voice over Internet Protocol), Internet voice, etc. More specifically, Customer 110 may communicate using public switched telephone network (PSTN), MSTN or other type of network, represented by 112. Customer 110 may also communicate via TDM/VoIP, Internet Voice, Web Real-Time Communication (WebRTC) to Voice Response 114 as well as a Live Chat or other interactive channel. Other types of voice and other forms of communication may be implemented. Voice Response 114 may interact with a Self-Service Application 116 to receive customer information and provide customer self service options.

For example, the Customer may initially engage an automated service to identify and/or authenticate the customer and ascertain the reason for the customer contact. Customer 110 may provide identifying information, account information and/or other data. During the automated service, the customer may request a transfer to an agent or other representative, via Session Management 118. More specifically, the customer may request to speak with a live agent. The customer may be transferred to Media Server 120. Here, the customer may be placed in a queue or on a hold. As the contact center is experiencing call surplus due to multiple reasons, the Customer may be provided with an approximate wait time in a queue. According to an embodiment of the present invention, the customer may be asked if he or she would like to engage in self-service via another channel, which may include voice, text, chat, web-based, a multi-modal and/or other form of communication while the Customer waits in the queue. In this example, the customer is still in queue to speak to a representative during a concurrent self-service session and may be informed of when an agent is available.

According to an embodiment of the present invention, the customer may select a self-service option via voice. In this example, Self-Service Application 116 may continue from a point the customer requested transfer. This may involve an automated voice interaction with the customer while the customer is on hold to speak with a live agent. Other modes of communication may include text-based, chat-based as well as other forms of automated interaction (e.g., full automation, partial automation, etc.).

According to another embodiment of the present invention, the customer may select a multi-modal interaction. A multi-modal interaction may provide users with multiple modes of interacting with the system. For example, a customer while on voice call with a contact center may also interact using an application such browser, SMS or an application on the mobile device. In this scenario, Routing Engine 126 sends a request to Session Management 118. Session Management 118 creates a link with a token and transmits to Short Message Service (SMS) Gateway 122. SMS Gateway 122 allows a computer to send and/or receive short message service transmissions to and/or from a telecommunications network. In this example, SMS Gateway 122 may send the link to a customer device, such as a mobile phone, smart phone, etc. An embodiment of the present invention recognizes that customers may be logged into the website, via Internet 150, before or during an interaction with the entity. If the customer has access to the website, the session may guide the customer to the right self-service page, section and/or other resource. For example, if the customer is seeking to report a fraudulent charge on an account, the system may guide the customer to an appropriate website and assist the customer to navigate to the correct page and section to report the fraud. During the process, the system may provide assistance, guidance, answer questions, etc. while the customer fills out a fraud report and/or provides information.

The Customer may access the link which launches the application on the phone or a URL in the browser, as represented by Internet 150. This request may come thru an Internet Gateway 124 to the Session Management layer (e.g., authentication, authorization, etc.), as represented by 118. The request coming from Internet Gateway 124 could be using a protocol, such as HTTPS protocol, to communicate with Session Management 118. Session Management 118 may represent a centralized component that manages interactions by assigning unique session identifier to each interaction. For example, an incoming request may have an embedded session identifier, token or other identifier that identifies the user session and other associated attributes captured as part of the previous channel session. According to an embodiment of the present invention, this linkage may allow intelligent treatment of the customer on the second channel.

Session Management 118 may invoke Self-Service Application 116 so the Customer may continue a self-serve interaction while the Customer is still on hold. If the transaction is complete, the Customer may close the application or browser and hang-up the voice call.

If the agent comes available or the customer is unable to complete the transaction, the call may be delivered to an agent, represented by 140. For example, the system may provide information on the customer's activities during the hold via the self-service function. The progress made during the self-service interaction may be communicated to the agent to further facilitate and expedite resolution.

An embodiment of the present invention may provide synchronization options. If an agent becomes available, then depending on how far and how well the customer is progressing in a digital channel, which may be considered the second channel, the customer may be asked if the customer still wants to talk to an agent. Also, the queue position of the customer may be adjusted to see if the customer is able to complete self-service, or connect to an agent. Other variations and responses may be implemented.

In addition, customer profile data and personal preferences may be obtained, stored and used for future contacts. For example, customer choices from the past interactions may be stored to ascertain customer preferences and thereby avoid providing this option to customers who have rejected it in the past. Such information may be stored at a storage, represented by Content Store 130, and accessed by Content Center Orchestration 128. Contact Center Orchestration 128 may handle and manage multiple sessions based on the unique session identifier from the Session Management layer. For example, Contact Center Orchestration 128 may execute a short workflow to determine how the session needs to be handled. It may use user configurable rules to make the orchestration flexible. Content Store 130 may represent a data holder that uses in-memory, disk memory as well as other types of memory to store and manage relevant information about the customer that may be used to make decisions.

An embodiment of the present invention may be directed to providing messaging and/or other text based communication while a Customer is on hold. According to an exemplary illustration, a call may be connected from a customer to an agent via Media Server 120. The Agent may place the Customer on hold via Media Server 120. The Agent may call another agent/supervisor, as represented by 142, for consult, assistance, escalation, etc. The Agent may perform other actions, e.g., look-up information, check procedure, seek authorization, etc.

While on hold, the Customer may desire to speak and/or update the agent with additional information, for example. The Customer may use dual tone multi frequency (DTMF) tones (which may be predetermined and/or programmed) to generate a message that may be delivered as text to an agent. In addition, the Customer may use voice, gestures, keyboard and/or other input to generate a message. Other forms of communication may be implemented.

Also, the Customer may request to join an existing conversation between an Agent and another Agent or Supervisor. In this example, the Agent may accept the message and respond via a text or other message, which may be spoken back to the Customer using text to speech (TTS) or other speech/voice technology. The Agent may also accept the customer's request to join and then speak to the customer or allow the customer to be conferenced in with the other agent/supervisor. Other variations for communicating while on hold may be implemented.

As illustrated, each component and device may be communicatively coupled with one or more other devices via a communication link or network. System 100 of FIG. 1 may be implemented in a variety of ways. Architecture within System 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. System 100 described below may be used to implement the various methods herein, by way of example. Various elements of the system 100 may be referenced in explaining the exemplary methods described herein.

The network implemented in System 100 may be a wireless network, a wired network or any combination of wireless network and wired network. For example, the network may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network may support an Internet network, a wireless communication network, a cellular network, Bluetooth, or the like, or any combination thereof. The network may further include one, or any number of the exemplary types of networks mentioned above operating as a stand-alone network or in cooperation with each other. The network may utilize one or more protocols of one or more network elements to which it is communicatively coupled. The network may translate to or from other protocols to one or more protocols of network devices. Although the network is depicted as one network for simplicity, it should be appreciated that according to one or more embodiments, the network may comprise a plurality of interconnected networks, such as, for example, a service provider network, the Internet, a cellular network, corporate networks, or even home networks, or any of the types of networks mentioned above.

Data may be transmitted and received via network utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments.

Customer 110 may communicate with the system using various devices, including any mobile or computing device, such as a laptop computer, a personal digital assistant, a smartphone, a smartwatch, smart glasses, other wearables or other computing devices capable of sending or receiving network signals. The devices may have an application installed that is associated with the financial institution, for example.

Context Store 130 may contain and manage data and information used by the system 200. Context Store 130 may represent an in-memory database for real-time (e.g., Apache, Ignite, Oracle, etc.) and persistent Big Data storage using HDFS, such as Hadoop, for example. Context Store 130 may represent a database cluster, a Cloud storage interface or other type of storage device. For example, Context Store 130 may store customer preference data, account data for customers as well as customer profile data. Context Store 130 may also contain additional information related to the operation and administration of the system 100. Context Store 130 may include any suitable data structure to maintain the information and allow access and retrieval of the information. For example, Context Store 130 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Context Store 130 may be any suitable storage device or devices. The storage may be local, remote, or a combination thereof with respect to Context Store 130. Context Store 130 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Context Store 130 may have back-up capability built-in.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 2:
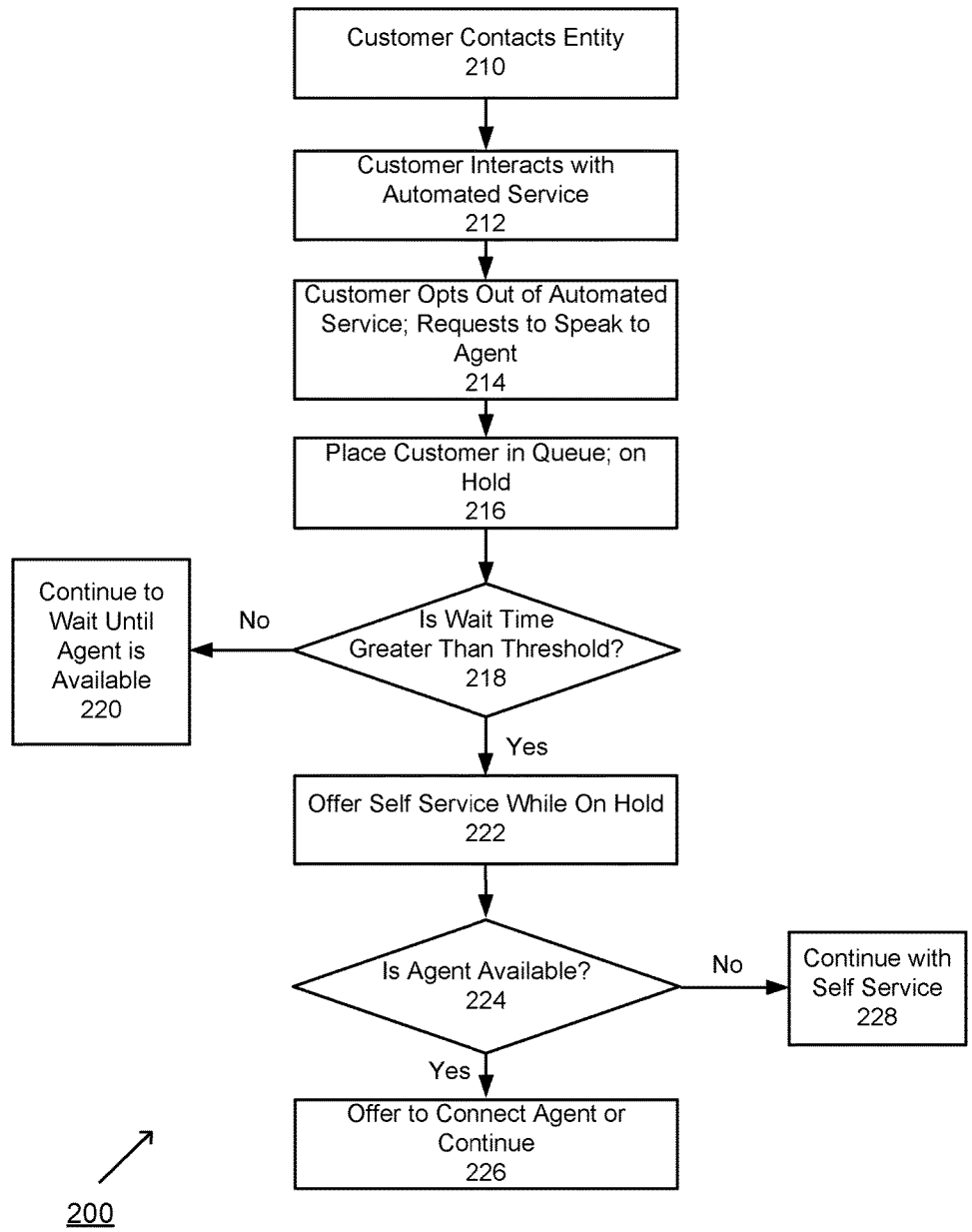
FIG. 2 is an exemplary flowchart of a method for customer interaction during a customer hold, according to an embodiment of the present invention.

FIG. 2 is an exemplary flowchart of a method for customer interaction during a customer hold, according to an embodiment of the present invention. At step 210, a customer may interact with an entity. At step 212, the customer may interact with an automated service, such as an IVR. At step 214, the customer may opt out of the automated service and request to speak to a customer representative. At step 216, the customer may be placed on hold, depending on the call volume. At step 218, the system may determine whether a customer wait time is above a threshold. At step 220, if the wait time is below the threshold, the customer may continue to wait until an agent is available. At step 222, if the wait time exceeds the threshold, the customer may be offered a self-service option during the hold. At step 224, the system may determine whether the agent is available. If yes, the customer may be connected to the agent at step 226. If no, the customer may continue self-service option until completion, at step 228. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a customer may interact with a contact center associated with an entity, such as a financial institution, merchant representative, service provider, as well as other agent or representative. For example, the customer may contact a financial institution representative to question about an account, a new product, etc. The customer may communicate with the entity, via a first communication channel. In this example, the customer may communicate via a voice channel using a phone, mobile device or other communication device. According to another example, the first communication channel may support text, chat and/or other form of interaction or communication.

At step 212, the customer may interact with an automated service, such as an IVR. For example, the customer may interact with a voice response unit to gather customer identification, account information as well as reasons for the contact. This may be obtained via a customer self-service feature. The customer may interact with an IVR, and/or other interactive mechanism.

At step 214, the customer may opt out of the automated service and request to speak to a customer representative. For example, the customer may hear a list of options and because the customer's question does not fall into a specific category, the customer may elect to opt-out and speak with a customer representative (e.g., by pressing "0"). In another example, the customer may immediately press "0" to speak with a customer representative prior to the automated service, without providing an indication of the reason for the contact.

At step 216, the customer may be placed on hold. Due to call volume, the customer may be placed in a queue. The customer will be transferred to an agent when it is the customer's turn. The customer may be transferred to a media server as the contact center is experiencing a high volume of calls due to various reasons.

At step 218, the system may determine whether a customer wait time is above a threshold. For example, the system may provide an estimate of wait time. Also, the threshold may be predetermined, variable, etc. The system may analyze past customer data and determine a threshold specific to a customer. For example, if a wait time is long enough, a customer may be more inclined to engage in a self-service feature.

At step 220, if the wait time is below the threshold, the customer may continue to wait until an agent is available.

If the wait time is longer than a predetermined threshold, e.g., 5 minutes, etc., the customer may be may be offered a self-service option during the hold, at step 222. The customer is provided with an approximate wait time in queue and asked if they would like to continue self-service either via voice or a multi-modal application while they wait in queue. The customer may retain a position in the queue to speak to a representative. The self-service option provides an opportunity for the customer to resolve the issue while on hold and even avoid having to speak with a customer representative. For example, the self-service option may be via a separate communication channel, different from the first communication channel.

At step 224, the system may determine whether the agent is available. If yes, the customer may be connected to the agent at step 226. If the customer requests to be connected to the agent, the system may provide in-progress information to the agent to expedite the customer's contact. For example, the customer may have pursued self-service options during the hold. Any progress made may be collected and forwarded to the agent to assist the agent in better understanding the customer and the reason for the customer contact. Further, based on the interactions made during the self-service option, the agent may be better equipped and informed to address the customer in a more efficient and timely manner.

If no, the customer may continue self-service option until completion, at step 228. If the customer resolves the issue during the self-service option, the system may record the customer contact for future interactions. The system may continue to offer the self-service option during a customer hold. However, if the customer refuses the option after multiple offers, the system may learn from this behavior and indicate in the customer's profile or preference data to exclude the self-service option. According to another example, the system may designate a DTMF tone to initiate a self-service option during hold. For example, most customer service centers designate "0" to request an live agent or operator; the system may designate another DTMF tone to invoke a self-service option during a hold, or at any time during a contact. Also, based on the customer's preference, profile and/or past behavior, the system may automatically invoke a preferred alternate channel during the self-service option. For example, a customer may prefer at text messaging channel during a hold. Accordingly, the system may invoke this alternative channel for self-service options. Other variations may be implemented.

Figure 3:
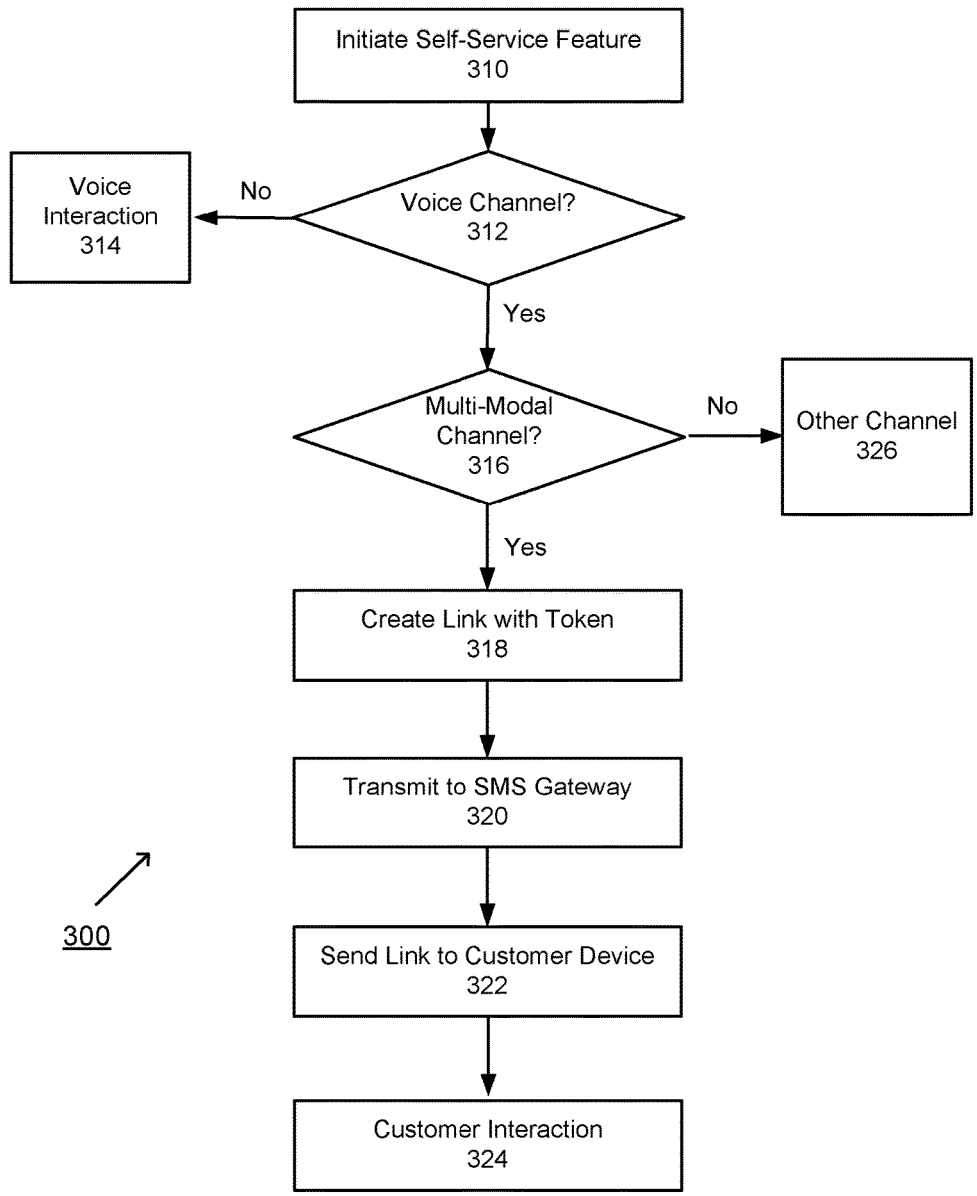
FIG. 3 is an exemplary flowchart for providing a self-service option during a customer hold, according to an embodiment of the present invention.

FIG. 3 is an exemplary flowchart for providing a self-service option during a customer hold, according to an embodiment of the present invention. At step 310, the customer may initiate a self-service option during a customer hold. At step 312, the customer may select a voice channel option. Upon selection, the customer may proceed to Voice Interaction 314. At step 316, the customer may initiate a multi-modal option. At step 318, a link with a specific token may be created. At step 320, the system may send the link to SMS gateway. At step 322, the system may send the link to a customer device. At step 324, a customer interaction may occur. Other options and/or channels may be provided and selected, at step 326. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, the customer may initiate a self-service option during a customer hold. For example, the customer may initiate a separate channel of communication to resolve the customer's issue and reason for the call. In this example, the customer may initiate a separate voice channel option, multi-modal option as well as other form of communication and/or interaction.

At step 312, the customer may select a voice channel option, according to an exemplary application. Upon selection, the customer may proceed to Voice Interaction 314. If the customer chooses self-service via voice, the self-service application continues from the point the customer requested transfer.

At step 316, the customer may initiate a multi-modal option. Multimodal interaction may include multiple modes of interacting with a system. For example, a multimodal interface may provide several distinct mechanisms for input and output of data. A multimodal question answering system may employ multiple modalities (e.g., text, photo, etc.) at input and output levels. For example, while the customer is on hold, the customer may be provided with an option to self-service using an IVR, guided mobile application and/or a browser application. The customer may continue to work with the automated system for resolution.

At step 318, a link with a specific token may be created. A Routing Engine may send a request to a Session Management. Session Management may then create a link with specific token.

At step 320, the system may send the link to SMS gateway. For example, a Session Management may transmit the link to a SMS Gateway. The SMS Gateway may send the link to customer mobile phone. An embodiment of the present invention recognizes that many customers access a website or other online resource before, during and even after a customer contact. In this example, a concurrent self-service session maybe used to guide the customer through the website or other online or electronic resource.

At step 322, the system may send the link to a customer device. The customer may click on or otherwise activate the link which launches the application on the phone or a URL in the browser. The link may take the user to other websites, resources, etc.

At step 324, a customer interaction may occur. Other options and/or channels may be provided and selected. Session Management may invoke the Self-Service Application so the user may continue self-serve while still on hold.

If agent becomes available, then depending on how far and how well the customer is progressing in the digital channel, the customer can either be asked if they still want to talk to an agent, or can be moved one position later in the queue to see if they are able to complete self-service, or connect to an agent.

Figure 4:
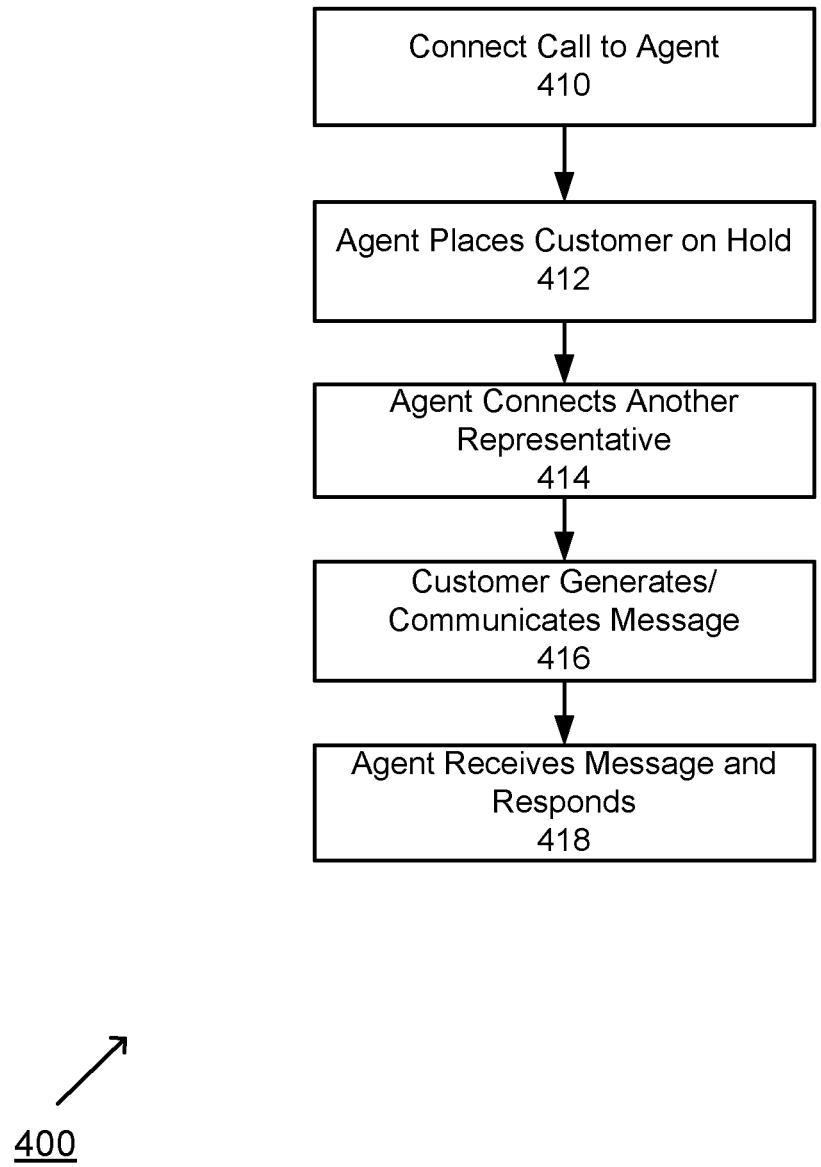
FIG. 4 is an exemplary flowchart of a messaging feature during a customer hold, according to an embodiment of the present invention.

FIG. 4 is an exemplary flowchart of a messaging feature during a customer hold, according to an embodiment of the present invention. At step 410, a customer call may be connected to an agent. At step 412, the agent may place the customer on hold. At step 414, an agent may connect to another representative or resource, such as another agent, supervisor, technical expert, subject matter expert, etc. At step 416, the customer may generate a message. At step 418, the agent may receive the message and respond with another message, action and/or other response. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 410, a customer call may be connected to an agent.

At step 412, the agent may place the call on hold. During the customer contact, the customer may interact with a live agent.

At step 414, the agent may connect to another representative or resource, such as another agent, supervisor, technical expert, subject matter expert, etc. For example, the agent may call another agent, supervisor and/or other representative for consultation, assistance, escalation, etc.

While the customer is placed on hold, the customer may request to speak with or update an agent with additional information, resolution, hang-up, reschedule and/or other update. For example, a customer may contact a contact center with regards to a credit card that was shipped overnight. The reason for the call may be to inquire about the card. While the agent has the customer on hold to validate the status and location of the shipment, the card may have been delivered and received by the customer. At this point, the customer may inform the agent that the card has been received and assistance is no longer needed. In this example, the customer may press DTMF tones and/or speak an update message. The voice may be converted to text and sent to the agent, via a desktop or other application. The customer may communicate via messages, texts, etc.

At step 416, the customer may generate a message. The Customer may use DTMF tones (which may be predetermined, programmed, etc.) to record a message that may be delivered as text or other format to an agent. Other forms of input may be supported. The Customer may generate a message via other methods as well, including voice input, keyboard, image, emoticons, video, etc. In addition, customers may request to join an existing conversation between agent and agent/supervisor.

At step 418, the agent may receive the message and respond with another message, action and/or other response. In this example, the agent may accept the message and respond as a text which may be spoken back to the customer using text to speech (TTS) feature. Also, the agent may accept the customer's request to join and communicate with the customer. In addition, the agent may allow the customer to be conferenced in with the other agent, supervisor and/or representative. The customer and agent may interact and communicate as needed or desired.

Although the foregoing description has focused primarily on a financial institution providing self service options while customers are on hold, the system may be operated and maintained by other types of service providers and/or other entities who may configure the system to provide similar advantages to their customers.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

FIG. 1 may include a number of servers and user communication devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers, modules, components illustrated in FIG. 2 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A customer interaction management system comprising:
    a memory that stores and manages customer profile data and customer interaction data;
    an input that receives a voice input from a customer; and
    a computer processor, coupled to the memory and the voice input, programmed to:
    interact, via a first communication channel, with the customer via an automated self-service feature to address a current customer issue relating to a customer account;
    receive a customer input to opt out of the automated self-service feature;
    place the customer in a queue with an estimated wait time;
    determine whether the estimated wait time exceeds a threshold wait time;
    engage the customer in a self-service on hold feature via a second communication channel separate from the first communication channel, wherein the second communication channel comprises a messaging channel;
    generate a link with a token, wherein the link provides access to one or more webpages;
    transmit the link to a customer device associated with the customer with corresponding data to guide the customer through the one or more webpages to address the current customer issue;
    maintain the customer's place in the queue while the customer interacts with the self-service on hold;
    determine the customer's progress in resolving the current customer issue during the self-service on hold;
    provide an option to the customer to continue with the second communication channel and adjust the customer's place in the queue; and
    when an agent becomes available, provide an option to connect the customer to the available agent and further communicate the customer's progress to the available agent.

2. The system of claim 1, wherein the threshold wait time is a configurable parameter.

3. The system of claim 1, wherein the second communication channel further comprises a separate voice channel.

4. The system of claim 1, wherein the customer interacts with a website associated with the link.

5. The system of claim 1, wherein the second communication channel further comprises a separate voice channel.

6. The system of claim 1, wherein the second communication channel represents a multi-modal channel.

7. The system of claim 1, wherein during an interaction with a live agent, the customer is placed on hold.

8. The system of claim 7, during the customer hold, the customer generates a message to be transmitted to the live agent via a message channel.

9. A customer interaction management method, the method comprising the steps of:
    interacting, via a first communication channel, with the customer via an automate self-service feature to address a current customer issue relating to a customer account;
    receiving a customer input to opt out of the automated self-service feature;
    placing the customer in a queue with an estimated wait time;
    determining whether the estimated wait time exceeds a threshold wait time;
    engaging the customer in a self-service on hold feature via a second communication channel separate from the first communication channel, wherein the second communication channel comprises a messaging channel;
    generating a link with a token, wherein the link provides access to one or more webpages;
    transmitting the link to a customer device associated with the customer with corresponding data to guide the customer through the one or more webpages to address the current customer issue; and
    maintaining the customer's place in the queue while the customer interacts with the self-service on hold;
    determining the customer's progress in resolving the current customer issue during the self-service on hold;
    providing an option to the customer to continue with the second communication channel and adjust the customer's place in the queue; and
    when an agent becomes available, providing an option to connect the customer to the available agent and further communicating the customer's progress to the available agent.

10. The method of claim 9, wherein the threshold wait time is a configurable parameter.

11. The method of claim 9, wherein the second communication channel further comprises a separate voice channel.

12. The method of claim 9, wherein the customer interacts with a website associated with the link.

13. The method of claim 9, wherein the second communication channel further comprises a separate voice channel.

14. The method of claim 9, wherein the second communication channel represents a multi-modal channel.

15. The method of claim 9, wherein during an interaction with a live agent, the customer is placed on hold.

16. The method of claim 15, during the customer hold, the customer generates a message to be transmitted to the live agent via a message channel.

* * * * *